UNITED STATES PATENT OFFICE.

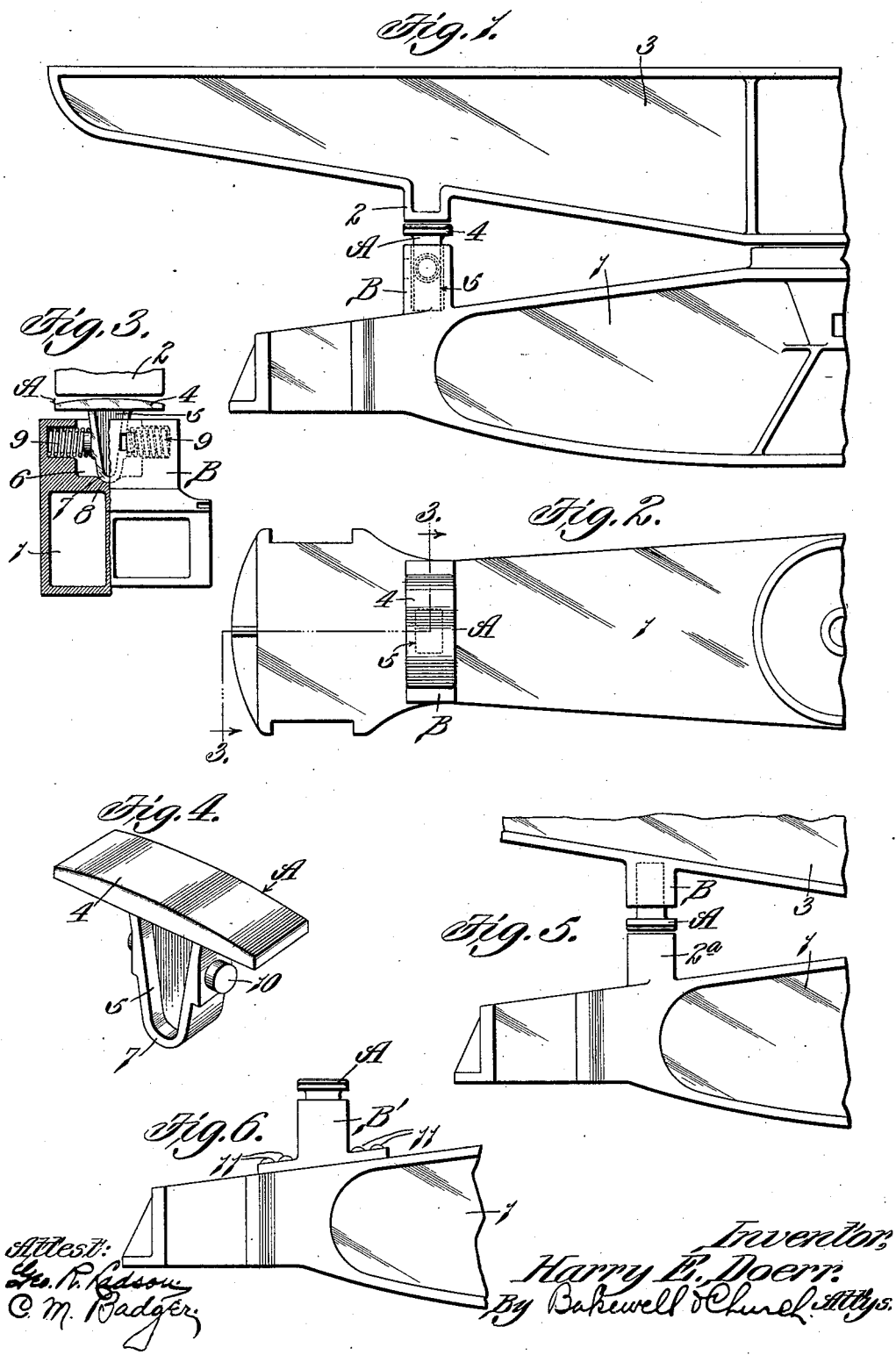

HARRY E. DOERR, OF ST. LOUIS, MISSOURI, ASSIGNOR TO SCULLIN-GALLAGHER IRON & STEEL COMPANY, OF ST. LOUIS, MISSOURI, A CORPORATION OF MISSOURI.

SIDE BEARING FOR RAILWAY-CARS.

1,095,715.   Specification of Letters Patent.   Patented May 5, 1914.

Application filed August 26, 1912. Serial No. 717,179.

*To all whom it may concern:*

Be it known that I, HARRY E. DOERR, a citizen of the United States, residing at St. Louis, Missouri, have invented a certain new and useful Improvement in Side Bearings for Railway-Cars, of which the following is a full, clear, and exact description, such as will enable others skilled in the art to which it appertains to make and use the same.

This invention relates to side bearings for railway cars.

One object of my invention is to provide an efficient anti-friction side bearing of simple construction that is not liable to break or get out of order.

Another object is to provide an anti-friction side bearing which is so designed that it will operate to raise the body of the car slightly on which it is used as soon as the weight of the car is imposed on same, tending to throw the center of gravity inward and also reduce the friction between the coöperating side bearing members on the truck and car bolsters. And still another object is to provide an inexpensive side bearing that comprises only a few parts of simple construction which are not liable to become disassembled after the side bearing has been installed.

Other objects and desirable features of my invention will be hereinafter pointed out.

Briefly described, my improved side bearing consists of a rockable bearing member which is so designed that it will raise the body of the car slightly as soon as the weight of the body of the car is thrown onto same, thereby tending to restore the equilibrium and also reducing the friction between said member and the bearing member with which it coöperates. Said rockable bearing member may be arranged either on the truck bolster or on the body bolster of the car, and means is provided for guiding said member and restoring it to its normal upright position as soon as the load is removed from same.

Figure 1 of the drawings is a side elevational view of a portion of a car truck bolster provided with an anti-friction side bearing constructed in accordance with my invention, said view also showing a portion of the body bolster of the car on which the bearing is used; Fig. 2 is a top plan view of the truck bolster shown in Fig. 1; Fig. 3 is a detail vertical sectional view taken on approximately the line 3—3 of Fig. 2; Fig. 4 is a perspective view of the rockable member of my improved side bearing; Fig. 5 is a view similar to Fig. 1 showing my improved side bearing applied to a body bolster; and Fig. 6 is a side elevational view of a portion of a truck bolster illustrating a slight modification of my invention.

Referring to Figs. 1 to 4 of the drawings which illustrate the preferred form of my invention, A designates the rockable member of my improved side bearing, said member being arranged on a truck bolster 1 in alinement with a coöperating bearing member 2 on the body bolster 3 of the car which the truck bolster supports. The member A is retained in operative position by means of a housing or guiding member B and is so designed that it will rock or tilt slightly and thus raise the car bolster 3 whenever a load is imposed on said member, as, for example, when a car is rounding a curve. In the preferred form of my invention as herein shown, the rockable bearing member A is provided with a head 4 whose top face is convexed slightly, and with a body portion 5 that fits between the side walls of a pocket or chamber 6 formed in the housing or guiding member B. The lower end of the body portion 5 of the member A is curved at 7, and the bottom of the pocket 6 in the guiding member B is provided with a curved seat 8 that receives the curved lower end of the body part of the member A, said pocket 6 being of sufficient length to permit the member A to rock back and forth on the curved seat 8 as a fulcrum. The head 4 of the member A is comparatively long and the convexed top face of said head has a greater radius than the curved lower end 7 of the body portion 5 of the member A. Consequently, when the member A rocks or tilts one end of the head 4 will move upwardly above the horizontal plane in which the center portion of the top face of the head 4 normally lies and thus raise the body of the car slightly, thereby shifting the center of gravity so as to tend to restore the equilibrium of the body of the car.

Various means may be used for restoring the member A to its normal upright position, as shown in Fig. 3, and for holding it in this position, and the means that I have herein shown for this purpose consists of two coiled expansion springs 9 arranged in the guiding member B on the opposite sides of the body portion 5 of the rockable bearing member A, the member B being provided with seats or sockets for said springs and the member A being provided with laterally projecting centering devices 10 that project into the springs, as shown clearly in Fig. 3. The housing or guiding member B in which the rockable bearing member A is arranged, may either be cast integral with the truck bolster 1, as shown in Figs. 1, 2 and 3, or it may consist of a separate casting B' that is detachably connected to the bolster by means of fastening devices 11, as shown in Fig. 6. Furthermore, if desired, my improved side bearing may be arranged on the under side of the body bolster 3 of the car in alinement with the coöperating bearing member $2^a$ on the truck bolster, as shown in Fig. 5.

Whenever a weight or load is imposed upon the member A of my improved side bearing, said member will rock slightly in one direction or the other, depending upon the direction in which the load is applied, and thus cause the body bolster of the car to be raised sligthly, thereby reducing the friction between the coöperating side bearing members on the body bolster and on the truck bolster and also shifting the center of gravity of the body of the car. As soon as the load is removed the springs 9 restore the member A to its normal upright position and retain it in this position.

A car side bearing of the construction above-described can be manufactured at a low cost because it consists of only two rough or unfinished castings and two springs; it is not liable to break when in service because the load is applied to the member A in a substantially vertical direction, and said member is so designed that it will start to rock or tilt as soon as a load is imposed on same; the bearing is very efficient and reduces friction to a minimum owing to the fact that the member A always remains in alinement with some portion of the coöperating bearing member on the body bolster and starts to rock or tilt as soon as the weight of the body of the car is thrown onto same; the bearing can be installed easily, and after it has been installed it is not apt to get out of order on account of the fact that it comprises so few parts.

Having thus described my invention, what I claim as new and desire to secure by Letters Patent is:

1. An anti-friction side bearing for railway cars, consisting of a housing carried by one of the bolsters and provided with an elongated pocket, a rockable bearing member comprising a body portion fitting between the side walls of said pocket and having a curved lower end that is seated in a curved recess in the bottom of said pocket, coiled springs interposed between the end walls of said pocket and the opposite sides of the body portion of said bearing member, and a head on the body portion of said member extending transversely of the bolster and having a convexed face that coöperates with a side bearing on the other bolster, the arc of said convexed face being greater than the arc of the recess in which the lower end of said body portion is seated.

2. In a side bearing for railway cars, an integral bearing member arranged on the body bolster of the car, a housing integrally arranged on the top surface of the truck bolster, a T-shaped bearing member that coöperates with said integral bearing member and is rockably mounted in said housing and provided on opposite sides of its vertical leg with a horizontally disposed dowel, horizontally disposed pockets formed in said housing, and a spring arranged on each of said dowels and extending into said pockets.

3. In a side bearing for railway cars, a bearing plate arranged on one of the bolsters, a housing arranged on the coöperating bolster, a T-shaped rocker that coöperates with said bearing plate, the upper surface of said rocker being curved, and the vertical leg of same extending into said housing, a dowel arranged on each side of said vertical leg, and a pair of coiled expansion springs mounted in said housing that coöperate with said dowels to maintain said rocker in an upright position.

In testimony whereof I hereunto affix my signature in the presence of two witnesses, this 24th day of August 1912.

HARRY E. DOERR.

Witnesses:
  WM. G. BRIDGEMAN,
  HARRY DREIBUSS.

---

Copies of this patent may be obtained for five cents each, by addressing the "Commissioner of Patents, Washington, D. C."